United States Patent [19]
Lin

[11] Patent Number: 6,127,970
[45] Date of Patent: Oct. 3, 2000

[54] COUPLED REAL TIME EMULATION METHOD FOR POSITIONING AND LOCATION SYSTEM

[76] Inventor: Ching-Fang Lin, 9131 Mason Ave., Chatsworth, Calif. 91311

[21] Appl. No.: 09/161,201

[22] Filed: Sep. 25, 1998

[51] Int. Cl.⁷ .................. G01S 5/02; H04B 7/185
[52] U.S. Cl. ........................................... 342/357.14
[58] Field of Search ............... 342/357.14; 701/220, 701/221

[56] References Cited

U.S. PATENT DOCUMENTS 5,790,438  8/1998  Simonnet .................. 342/165

*Primary Examiner*—Thomas H. Tarcza
*Assistant Examiner*—Fred H. Mull
*Attorney, Agent, or Firm*—Raymond Y. Chan; David and Raymond

[57] ABSTRACT

A coupled real time emulation method for positioning and location system includes the steps of receiving real time trajectory data from a 6DOF trajectory generator and generating global positioning system simulated measurements and inertial measurement unit simulated electronic signals which are injected into an on-board integrated global positioning system/inertial measurement unit system. When the on-board integrated global positioning system/inertial measurement unit system is excited in dynamic operation, a performance thereof is able to be tested and evaluated as if carrying a real transportation test.

33 Claims, 11 Drawing Sheets

COUPLED REAL TIME EMULATION METHOD FOR POSITIONING AND LOCATION SYSTEM

FIELD OF THE PRESENT INVENTION

The present invention relates to a global positioning system and receiver emulation, a gyro and accelerometer emulation, and more particularly to a coupled real time emulation method of global positioning system, gyro and accelerometer for a hardware-in-the-loop integrated positioning system test on the ground.

BACKGROUND OF THE PRESENT INVENTION

There are commonly unsolved difficult problems in the ground tests and laboratory hardware-in-the-loop tests of the coupled inertial/global positioning system on-board a vehicle such as aircraft, ship and car.

In the ground test, since the vehicle is stationary, the inertial sensor in the global positioning/inertial navigation system can not produce dynamic electronic signals for it is a self-contained device, and the global positioning system receiver can not output dynamic measurements. In other words, it is unable to test the accuracy and errors of a global positioning/inertial integrated system installed on-board vehicle while it is stationary. If the inertial sensor, the global positioning system receiver, and the global positioning/inertial integrated system are installed on-board a ground vehicle such as a car, the tester can still process a motion test by actually driving the ground vehicle in relatively low cost. However, if the vehicle to be test is an aircraft, the cost and labors for actual-fly test are ultimately expensive.

In order to verify the correctness of the hardware and software elements of a fully coupled positioning system and/or to evaluate system performance on the ground or in the laboratory, the dynamic signals from the global positioning system receiver (GPSR), gyros, and accelerometers are required to excite the fully coupled positioning system. The present invention is related generally to a method for gyro, accelerometer, and global positioning system sensor coupled simulation.

The static test of a fully coupled positioning system is easy where the actual inertial sensors and global positioning system receiver can be used. The fully coupled positioning system is often installed on a moving platform, so that a dynamic test of the fully coupled positioning system is required before a mission. Obviously, the static method cannot be applied to the fully coupled positioning system dynamic test where the dynamic inertial measurements and global positioning system signals are required. Therefore, it is necessary that the essential parts of the gyros, accelerometers, and global positioning system receiver experience a trajectory identical to the expected mission for dynamic testing of the fully coupled positioning system.

The flight test provides a real environment for the fully coupled positioning system. A set of real flight tests is costly, and often not affordable during the development of a fully coupled positioning system. Also, before the flight test, the fully coupled positioning system must go through a series of official tests. Thus, a real time hardware-in-the-loop simulation of a gyro, accelerometer, and a global positioning system receiver is necessary during the development of a fully coupled positioning system as well as for a fully coupled positioning dynamic test before a mission.

A straightforward method for generating dynamic inertial measurements is to put an actual inertial sensor on a motion table. This method requires a large set of testing equipment. Moreover, its operational cost is high. Its dynamic motion is limited. Its data acquisition process during the test is not convenient. It cannot be used for simultaneous generation of dynamic global positioning system receiver measurements.

Some systems for global positioning system signal simulation generate suppressed radio frequency (RF) analog signals to test a global positioning system receiver. The RF output mimics the global positioning system signal emitted from the global positioning system satellites by modulating pseudo random noise code and navigation message data, such as ephemeris, clock parameters, even atmospheric data, on an L-band carrier (1,575.42 MHz) or two L-band carriers (1,575.42 MHz and 1,227.60 MHz). The simulated signal has the same amplitude and signal-to-noise ratio (SNR) as realistic one so that it can be directly injected into a global positioning system receiver through the antenna port.

SUMMARY OF THE PRESENT INVENTION

It is an object of the present invention to provide a coupled real time emulation method for positioning and location system that renders the testing of the installed global positioning/inertial system on the vehicle can be carried out in a laboratory or in an anechoic chamber facility.

It is another object of this invention to provide a coupled real time emulation method for positioning and location system that generates dynamic gyro and accelerometer signals, and produces dynamic global positioning system receiver measurements, under static conditions, identical to what would be encountered if the vehicle were flying. The present invention provides features supporting the development, debugging, and final integration of a global positioning/inertial integrated system. It also assures testers that the global positioning/inertial integrated system on-board vehicle works properly before and during a flight test. It also helps to debug and evaluate on-board global positioning/inertial integrated system.

It is still another object of this invention to provide a coupled real time emulation method for positioning and location system of real time hardware-in-the-loop static or dynamic test of a global positioning/inertial integrated system, which receives real time trajectory data from a 6DOF flight simulator and generates gyro electronic signals according to the gyro measurement model and error model, accelerometer electronic signals according to the accelerometer measurement model and error model, and dynamic global positioning system measurements according to the global positioning system model and the receiver model. The emulated dynamic electronic gyro and accelerometer signals and global positioning system receiver measurements are injected into the installed global positioning/inertial integrated system to perform dynamic test of global positioning/inertial integrated system on the ground.

It is a further object of this invention to provide a coupled real time emulation method for positioning and location system which allows unlimited dynamic test and performance evaluation of a global positioning/inertial integrated system because the motion devices are removed from the navigation system. With the gyro, accelerometer, and global positioning system receiver emulation method and system the testers are able to test the global positioning/inertial integrated system performance over a real mission trajectory.

It is still a further object of this invention to provide a coupled inertial sensor and global positioning system emulation method and system that is efficiently utilized for ground test of installed system, laboratory hardware-in-the-loop dynamic simulation, and global positioning/inertial integrated system analysis and development.

Another object of this invention is to provide a coupled real time emulation method for positioning and location system that can perform accurate test for the global positioning/inertial system. In the simulated test, the reference trajectory is accurate and known, since it is defined by the testers, so that the high accuracy of the simulated method is very useful for the performance verification of the global positioning/inertial system.

Another object of this invention is to provide a coupled real time emulation method for positioning and location system, which is adapted to predict and evaluate the dynamic performance of an global positioning/inertial system through a simulated test that can make the follow on real flight test safer and will greatly reduce the number of the real flight test. Consequently, the operation and test cost of the simulated method is low for it does not need the expensive motion device in the test system. The maintenance of the test system is simplified.

It is still a further object of the present invention to provide a coupled real time emulation system for positioning and location system, which is driven by a 6DOF trajectory generator to simultaneously generate synchronized dynamic gyro, accelerometer, and global positioning system receiver measurements. During the test, the installed fully coupled positioning system on the vehicle remains motionless. Therefore, the present invention provides an integrally dynamic hardware-in-the-loop test of fully coupled positioning system on the ground or in a laboratory environment.

It is still a further object of the present invention to provide a coupled real time emulation system for positioning and location system, in which the dynamic inertial measurements are generated in high fidelity through inertial sensor measurement modeling and error modeling, and a specific interface with the fully coupled positioning system.

It is still a further object of the present invention to provide a coupled real time emulation system for positioning and location system, in which the global positioning system receiver measurements are generated in high fidelity through real time global positioning system satellite constellation simulation, intermediate frequency (IF) signal generation, global positioning system receiver tracking loop simulation, and output data formatting.

According to the principle of the present invention, the method of simulating the coupled inertial sensor and global positioning system comprises inertial measurement modeling, inertial sensor error modeling, global positioning system error modeling, synchronization of inertial measurements and global positioning system data, simulated data formatting, and output interfaces. The system for coupled inertial sensor and global positioning system emulation according to the principles of the present invention comprises of a computer used as computing platform, an RS-232 serial port for the emulated global positioning system data output, an inertial sensor signal generation circuitry.

DETAILED DESCRIPTION OF THE REFERRED EMBODIMENT

Figure 1:
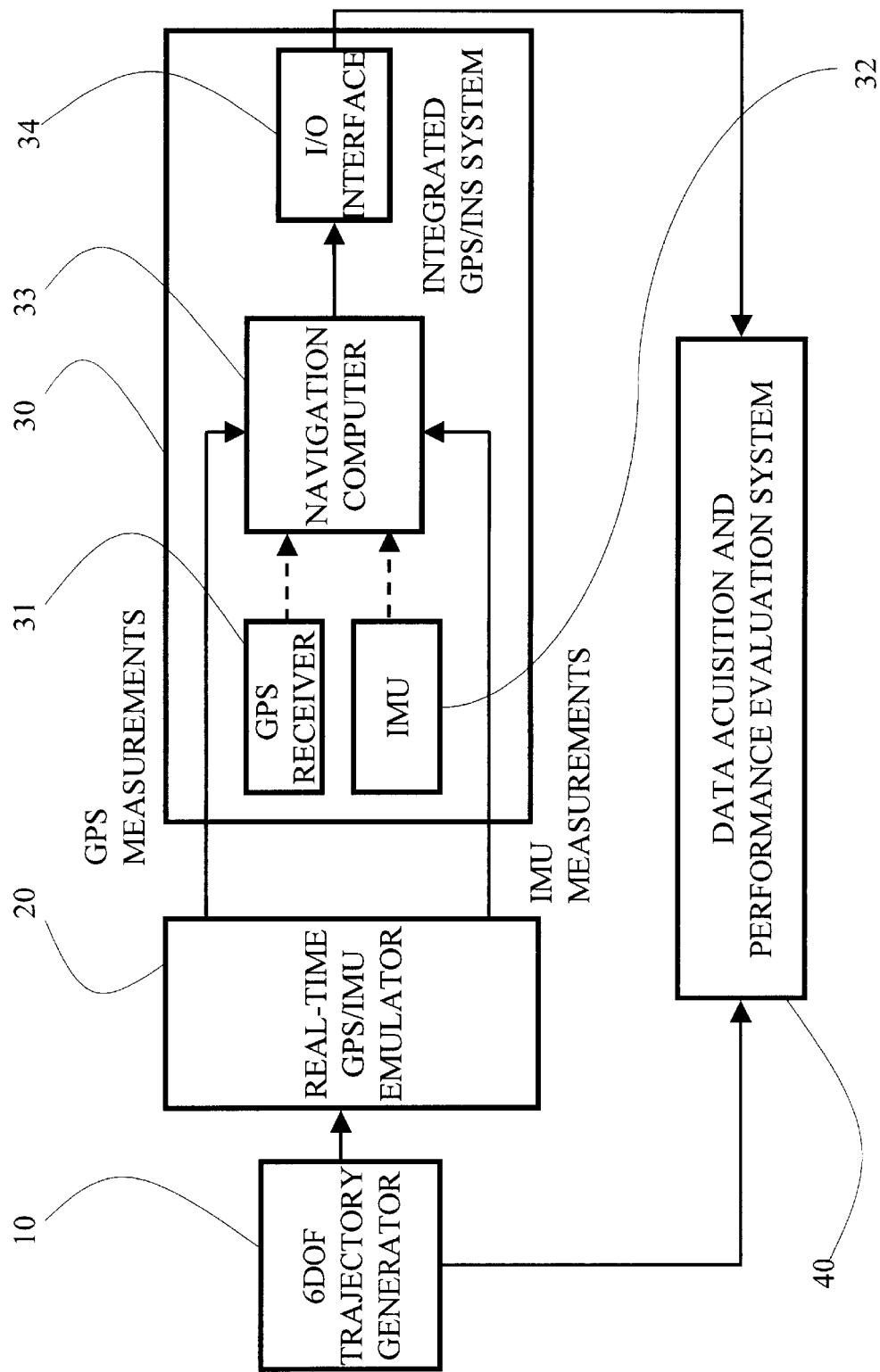
FIG. 1 is a block diagram illustrating a coupled real time emulation system equipped with a 6DOF trajectory generator, a test analysis system, and a fully-coupled positioning system according to a preferred embodiment of the present invention.

The present invention relates to a method and system for coupled (global positioning system/inertia measurement unit) GPS/IMU sensor emulation. The technique involves IMU modeling, IMU error modeling, GPS receiver modeling, GPS error modeling, and simulated data formatting. During the hardware-in-the-loop test, a 6DOF trajectory generator drives the present system to produce dynamic IMU and GPS measurements. These simulated data and signals are injected into the integrated GPS/INS system. The advantages of the technique applied in the present invention include:

1. Simulating dynamic IMU measurements in real time using software;
2. Simulating the behavior of a GPS receiver in a dynamic and jamming environment using software;
3. Simulating the GPS and IMU simultaneously using synchronization technique;
4. Having unlimited dynamic IMU sensors and GPS receiver simulation capability coupled with a 6DOF generator; and
5. Providing a cost-effective test method for the GPS/INS system and its cost of maintenance is low.

The present invention can substantially solve the problems in the ground test and hardware-in-the-loop test of integrated GPS/INS navigation system on-board vehicle. In the ground test, since the vehicle is stationary, the IMU in the navigation system cannot produce dynamic electronic signals because it is a self-contained device, and the GPS receiver also cannot output dynamic GPS measurements because it does not experience a trajectory. In order to carry out dynamic test of integrated GPS/INS navigation system on the ground, the present invention provides a coupled real time IMU and GPS emulation method and system that excites the integrated GPS/INS system on-board vehicle and makes it possible to predict and evaluate the dynamic performance of the GPS/INS navigation system through replacing the IMU and the GPS receiver by the coupled GPS/IMU emulation system. This method makes the follow on real flight test safer and will great reduce the flight number, and consequently, the test cost.

Although the invention will hereinafter be described specifically for test of a GPS/INS navigation system, it is to be understood that certain aspects thereof are useful for other inertial sensor emulations.

The present invention is based on advanced real time simulation, computation, and electronic technologies. A GPS model and an IMU model are embedded in a host computer. The GPS model consists of a signal generator and two GPS receiver models. The signal generator is used to mimic the received intermediate frequency GPS signals. One GPS receiver model is a simplified model without tracking loop simulation, another model is a detailed model with models of correlators in a tracking loop. Either one has capability for GPS receiver dynamic performance simulation and jamming resistance performance simulation. The IMU model comprises a gyro model and an accelerometer model, and a group of gyro and accelerometer error models.

The synchronization is one key problem in the coupled real time GPS/IMU emulation system which is obtained by the coupled emulation method in this patent. For the case of using one computer to emulate GPS and IMU, the synchronization is realized by the 6DOF triggering and a timing module for data output. The real time trajectory data from a 6DOF generator drive the GPS emulation module as well as the IMU emulation module at the same time. It means that the same trajectory data corresponding to one epoch are used to calculate the GPS measurements according to the GPS satellite constellation model and the GPS receiver model, to calculate the IMU measurements according to the IMU measurement models and error models, i.e. the gyro model, the accelerometer model, and their error models, although the emulated GPS data and IMU data will be computed separately by using only one computer.

Figure 2:
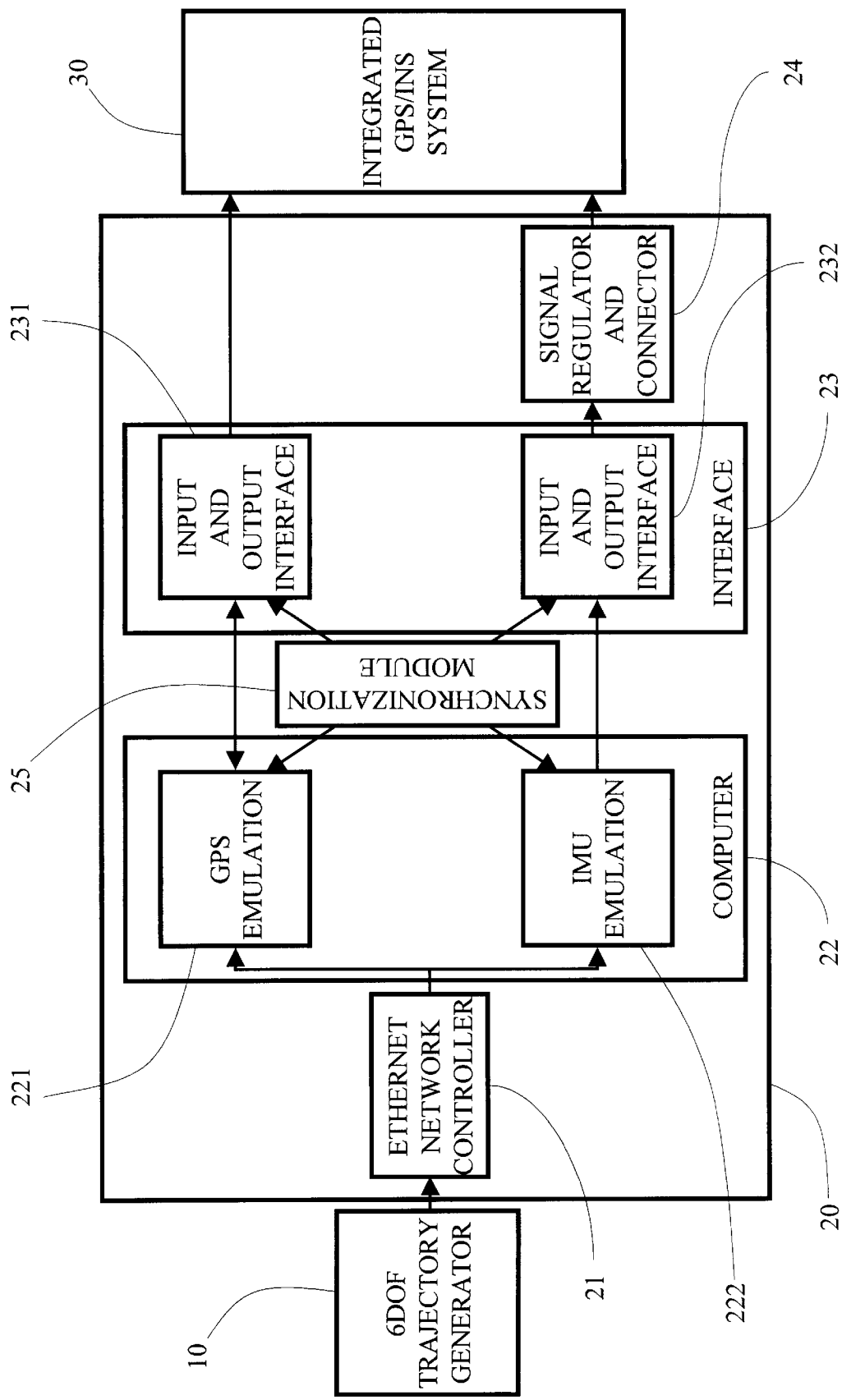
FIG. 2 is a block diagram illustrating the coupled real time emulation system according to the above preferred embodiment of the present invention.

The computer can calculate the IMU data first, or calculate the GPS measurement data first. Each way is fine for the coupled real time emulation method of the present invention. Whoever is calculated first, it must wait for the second emulated data, the IMU data or the GPS measurement data. A timing software module regulates the output of the emulated IMU data and GPS measurement data in a synchronization fashion. Referring to FIG. 2, the emulated GPS measurement data will be sent out through a GPS Input and Output Interface 231, and the emulated IMU data will be sent out through an IMU Input and Output Interface 232. The emulated IMU data and GPS measurement data will be stored in the buffer to wait the triggering signal. The triggering signal is provided by the computer clock or comes from an outside synchronization signal. At the triggering time, the emulated GPS measurements and IMU data are sent out synchronously.

So the coupled GPS and IMU emulation method of the present invention which utilizes one computer is to calculate GPS measurements and IMU data using the same trajectory data at different time in a serial fashion, and output these emulated data at the same time.

The real time GPS/IMU emulation can also be realized by two computers, one is used for GPS emulation, another one is used for IMU emulation. The synchronization is also one key problem in the coupled real time GPS/IMU emulation system using two computers which can also be obtained by the coupled emulation method in this patent. For the case of using two computers to emulate GPS and IMU, the real time trajectory data from one 6DOF generator that drives both of the two computers to emulate GPS measurements and IMU data at the same time. It means that the same trajectory data corresponding to one epoch are used by two computers to calculate the GPS measurements according to the GPS satellite constellation model and the GPS receiver model and to calculate the IMU measurements according to the IMU measurement models and error models, i.e. the gyro model, the accelerometer model, and their error models at the same time.

The emulation of GPS and IMU may not be completed at the same time. Whichever is calculated first, it must wait for the second emulated data, the IMU data or the GPS measurement data. Also, a timing software module regulates the output of the emulated IMU data and GPS measurement data in a synchronization fashion. The emulated GPS measurement data also will be sent out through the GPS Input and Output Interface, and the emulated IMU data also will be sent out through the IMU Input and Output Interface. The emulated IMU data and GPS measurement data will be stored in the buffer to wait the triggering signal. However, the triggering signal is provided by the one of the two computers' clock or comes from an outside common synchronization signal. At the triggering time, the emulated GPS measurements and IMU data are sent out synchronously.

So the GPS and IMU coupled emulation method using two computers is to calculate GPS measurements and IMU data using the same trajectory data separately on different computer at the same time, and output these emulated data at the same time.

Some test facilities provide an IRIG B time generator. In this case, the emulated GPS measurements and IMU data are stamped with IRIG time as they are transmitted. The use of the IRIG B time generator facilitates synchronization of all of computers involved in a large test and simulation scenario.

To process the coupled real time (GPS/IMU) emulation method for positioning and location system of the present invention, as shown in FIG. 1, a 6DOF trajectory generator 10 is connected to a coupled real time GPS/IMU emulation system 20. The outputs of the emulation system is directly injected into an integrated GPS/INS system 30 through bypassing an real GPS receiver 31 and a real IMU device 32 in the integrated GPS/INS system 30.

The coupled real time (GPS/IMU) emulation method for positioning and location system such as the integrated GPS/INS system according to the present invention comprises the following steps:

1. Input IMU measurement models and IMU error models into the coupled real time GPS/IMU emulation system 20 according to a real IMU device 32 of the integrated GPS/INS system 30 to be tested. The IMU measurement models comprise gyro measurement model and accelerometer measurement model, which are determined by an inertial sensor principal. The IMU error models comprises gyro error model and accelerometer error model which are defined by a user according to the real IMU device 32 used in the integrated GPS/INS system 30 to be tested.

2. Produce real time trajectory data from the 6DOF trajectory generator 10 and send the real time trajectory data to the coupled real time GPS/IMU emulation system 20. The real time trajectory data are defined by the user. The coupled real time GPS/IMU emulation system 20 produces dynamic GPS measurements and IMU signals as if a vehicle is really moving along a trajectory defined by the user.

3. Generate output data including real time IMU data, identical to the real IMU device in a designed mission, by the IMU model of the coupled real time GPS/IMU emulation system 20, and the GPS measurements by the GPS receiver model in the GPS/IMU emulation system 20.

4. Format the GPS measurement data and convert the real time IMU data into IMU simulated electronic signals by an IMU signal generator in the coupled real time GPS/IMU emulation system 20. The IMU signal generator is in fact an interface board in an emulation computer provided in the coupled real time GPS/IMU emulation system 20. The IMU signal generator produces the IMU simulated electronic signals that are identical to those produced by the real IMU device 32 in the integrated GPS/INS system 30.

5. Process the simulated GPS measurements and generated IMU simulated electronic signals by a standard interface and a regulator and connector circuit to form suitable electrical specifications and connector pin arrangement that is compatible to the integrated GPS/INS system 30.

6. Inject the simulated GPS measurements and the IMU simulated electronic signals into the integrated GPS/INS system 30. When the integrated GPS/INS system 30 is excited in dynamic operation, a performance thereof is able to be tested and evaluated as if carrying a real transportation/flight test.

7. Collect test data from the integrated GPS/INS system 30, during the test, by a data acquisition and performance evaluation system 40 which includes a computer. Usually the comparison between the reference 6DOF trajectory data and the integrated GPS/INS resolved vehicle trajectory data is done to determine whether the integrated GPS/INS system 30 works properly and to evaluate its performance.

Referring to FIGS. 1 and 2, the coupled real time GPS/IMU emulation system 20 utilized in the above coupled real time emulation method comprises an Ethernet network controller 21, an emulation computer 22, an interface board 23, a signal regulator and connector board 24, and a synchronization module 25. The emulation computer 22 comprises a GPS emulation module 221 to performs GPS emulation and an IMU emulation module 222 to perform IMU emulation. The interface board 23 includes a GPS emulation input/output interface 231 and an IMU emulation input/output interface 232. The GPS emulation module 221 receives real time flight data from the 6DOF trajectory generator 10 and generates the dynamic GPS measurements including pseudoranges, carrier phases, and Doppler shifts, and positioning information such as location and velocity. These data are formatted (as well as the ephemeris and even atmospheric parameters) to simulated GPS measurements. The formatted data are sent out through the GPS emulation input/output interface 231 which is a standard RS-232 interface to the integrated GPS/INS system 30. For the tightly-coupled GPS/INS integration system, the velocity information from the integrated GPS/INS system 30 is sent through the same interface to the GPS simulation module. This feedback velocity information can be used for GPS tracking loop aiding to facilitate the tightly-coupled GPS/INS integration system.

The IMU emulation module 222 receives real time flight data from the 6DOF trajectory generator 10 and produces IMU simulated measurements. The IMU emulation input/output interface 232 projects the IMU measurements into specific simulated electrical signals. The simulated electrical signals, coupled with the simulated GPS measurements, are injected into the integrated GPS/INS system 30 which causes the on-board GPS/INS navigation computer 33 installed therein (as shown in FIG. 1) into working as if the aircraft is really flying. Accordingly, the coupled real time (GPS/IMU) emulation method of the present invention is efficiently utilized for ground test of installed GPS/INS navigation systems, laboratory hardware-in-the-loop dynamic simulation, and GNC system analysis and development.

The GPS emulation module 221 comprises a GPS satellite system modeling and GPS receiver modeling. There are two methods for GPS emulation according to the present invention: (1) a simplified emulation method without GPS signal generation and GPS receiver tracking loop simulation, and (2) a detailed emulation method coupled with GPS signal generation and GPS receiver tracking loop simulation.

Figure 3:
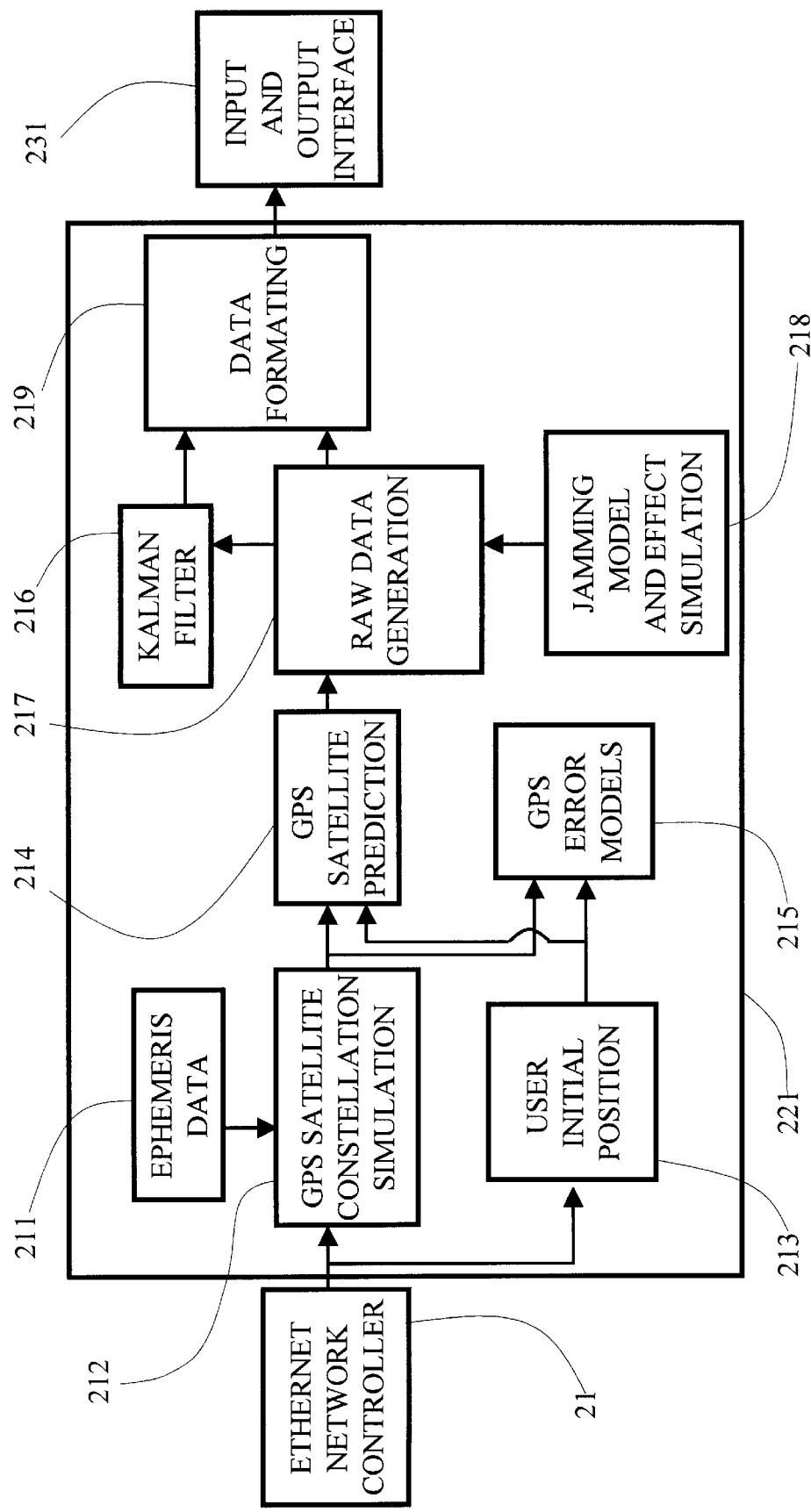
FIG. 3 is a block diagram illustrating the coupled real time emulation system with a simplified model according to the above preferred embodiment of the present invention.

The simplified emulation method is illustrated in FIG. 3. The 6DOF trajectory data from the 6DOF trajectory generator 10 triggers a GPS satellite constellation simulation 212. The GPS satellite constellation simulation 212 reads orbit parameters, satellite clock parameters, and atmospheric parameters from ephemeris data 211, which are stored in a GPS/IMU emulation computer. The GPS satellite constellation simulation 212 calculates the position and velocity vector in the Earth-Centered-Earth-Fixed (ECEF) coordinate system for all GPS satellites. The satellite constellation is a function of time and the ephemeris data. The time is also obtained from the 6DOF trajectory generator 10.

User's initial position 213 is given by the 6DOF trajectory data. A GPS satellite prediction 214 uses the information from the GPS satellite constellation simulation 212 and the user initial position 213 to determine the visible GPS satellites and their elevation, azimuth, and Doppler shifts. A GPS error models 215 uses the information from the GPS satellite constellation simulation 212 and the user initial position 213 to calculate the error correction terms, including the satellite clock correction, relativistic, ionospheric delay, tropospheric delay, and group delay.

The effect of the neutral atmosphere (i.e., the nonionized part) is denoted as tropospheric refraction. The neutral atmosphere is a nondispersive medium with respect to radio waves to frequencies up to 15 GHz, and thus the propagation is frequency independent. Consequently, a distinction between carrier phases and code ranges derived from different carriers L1 or L2 is not necessary.

Using real data covering the whole earth, Hopfield has found empirically a presentation of the dry refractivity as a function of the height above the surface. The wet portion is much more difficult to model because of the strong variations of the water vapor with respect to time and space. The Hopfield model assumes the same functional model for the wet component as that for the dry component. Based on the Hopfield model, many modified Hopfield models have been derived. Many other more accurate models have been provided by authors, which need the sky weather parameters as well as the surface weather data.

The tropospheric delay is independent upon the carrier frequency, and can be calculated from the height of GPS antenna and the satellite elevation angle. The vehicle's position is provided by the real time trajectory data. An assumption is made that the GPS antenna is the same as the vehicle's position which won't introduce error because the position deviation can be omitted comparing with the distance to the satellite. The elevation can be derived from the satellite position and vehicle position.

The ionosphere, extending in various layers from about 50 Km to 1000 Km above the earth, is a dispersive medium with respect to the GPS radio signal. For a satellite at zenith, the following formula gives the ionospheric delay for code pseudorange $$\Delta^{iono} = \frac{40.3}{f^2} TEC$$

where $f$ the carrier frequency, L1 or L2;

TEC the total electron content.

For carrier pseudorange, the ionospheric delay has the same form as the above equation, but with a negative symbol. For arbitrary lines of sight, the zenith distance of the satellite must be taken into account by $$\Delta^{iono} = \frac{1}{\cos z} \frac{40.3}{f^2} TEC$$

where $z$ the zenith distance at the height of $h_m$ above the earth.

The zenith distance z' has the relationship with the zenith distance z at the earth's surface, as follows $$\sin z = \frac{R_E}{R_E + h_m} \sin z$$

where $R_E$ the mean radius of the earth.

In the present invention, the ionospheric delay is calculated from the satellite azimuth, GPS time, vehicle's longitude and latitude, satellite elevation angle, and the satellite transmitted data words $\alpha_n$ and $\beta_n$ (n=0,1,2,3).

Selective Availability (SA) is a conscious degradation of positioning implemented by the Department of Defense (DoD) for unauthorized users. The typical positioning accuracy with SA on is 100 meters. Selective Availability uses a $2^{nd}$ order Gauss-Markov model as specified in RTCA/DO-208.

The effect of SA is simulated as the sums of (1) a second order Gauss-Markov process and (2) a random constant. The second-order Gauss-Markov process is described by the power spectral density:

$$S(\omega) = \frac{c^2}{\omega^4 + \omega_0^4} \, m^2/(\text{rad}/\text{sec})$$

where $c^2 = 0.002585 \, m^2$ $\omega_0 = 0.012 \, \text{rad}/\text{sec}$

The root-mean-square (RMS) value of the second order Gauss-Markov process is 23 meters and its time constant is 118 seconds. The random constant has a normal distribution with a zero mean and a standard deviation of 23 meters.

A jamming model and effect simulation 218 is used to simulate the impact of jamming on the GPS signal reception. An array of jammers defined by location, type, and effective radiating power is constructed and input to the jamming model and effect simulation 218. The types of jammers include pulsed, continuous wave (CW), and narrowband. The angle of incidence of the jammer signal on the GPS antenna gain pattern is calculated, and the attenuation at the receiver is determined. To analyze the collective effect of the jammer array, it is assumed that the jammer signals add incoherently. The model computes the jammer-to-signal power ratio (J/S) for each transmitter/receiver pair. The J/S ratio is a function of jammer type, jammer radiating power, distance between the transmitter and the receiver, GPS tracking frequency, and receiver antenna gain pattern. The effects of jamming on the GPS receiver 31 (as shown in FIG. 1) vary from complete loss of data to reduce tracking performance and degrade measurement accuracy. The location, type, and effective radiating power of jammer are determined by the user through an interactive operation.

A raw data generation 217 uses the information from the GPS satellite prediction 214, the GPS error models 215, and the jamming model and effect simulation 218 to calculate the simulated pseudorange, carrier phase, and delta range for all visible satellites. The pseudorange data is calculated from the satellite position, vehicle position, the ionospheric delay, tropospheric delay, and jamming effect. The carrier phase is calculated from the current and beginning distances between the satellite and the vehicle, and beginning fractal carrier phase. The satellite clock error is calculated from the satellite clock parameters. The Doppler shift is calculated from the satellite velocity and the vehicle dynamics.

A Kalman filter 216 calculates the receiver's position and velocity using the simulated raw data from the raw data generation 217, i.e. the pseudorange data, the carrier phase, and the delta range. The position and velocity information and the simulated raw data are formatted by a data formatting 219 along with the ephemeris data 211 according to a specific protocol. GPS receivers from different GPS receiver manufacturers output GPS measurements in different formats. The data formatting 219 is an integral part which allows the simulated GPS measurements has a format identical to that of the real GPS receiver 31 used in the GPS/INS navigation system.

Figure 4:
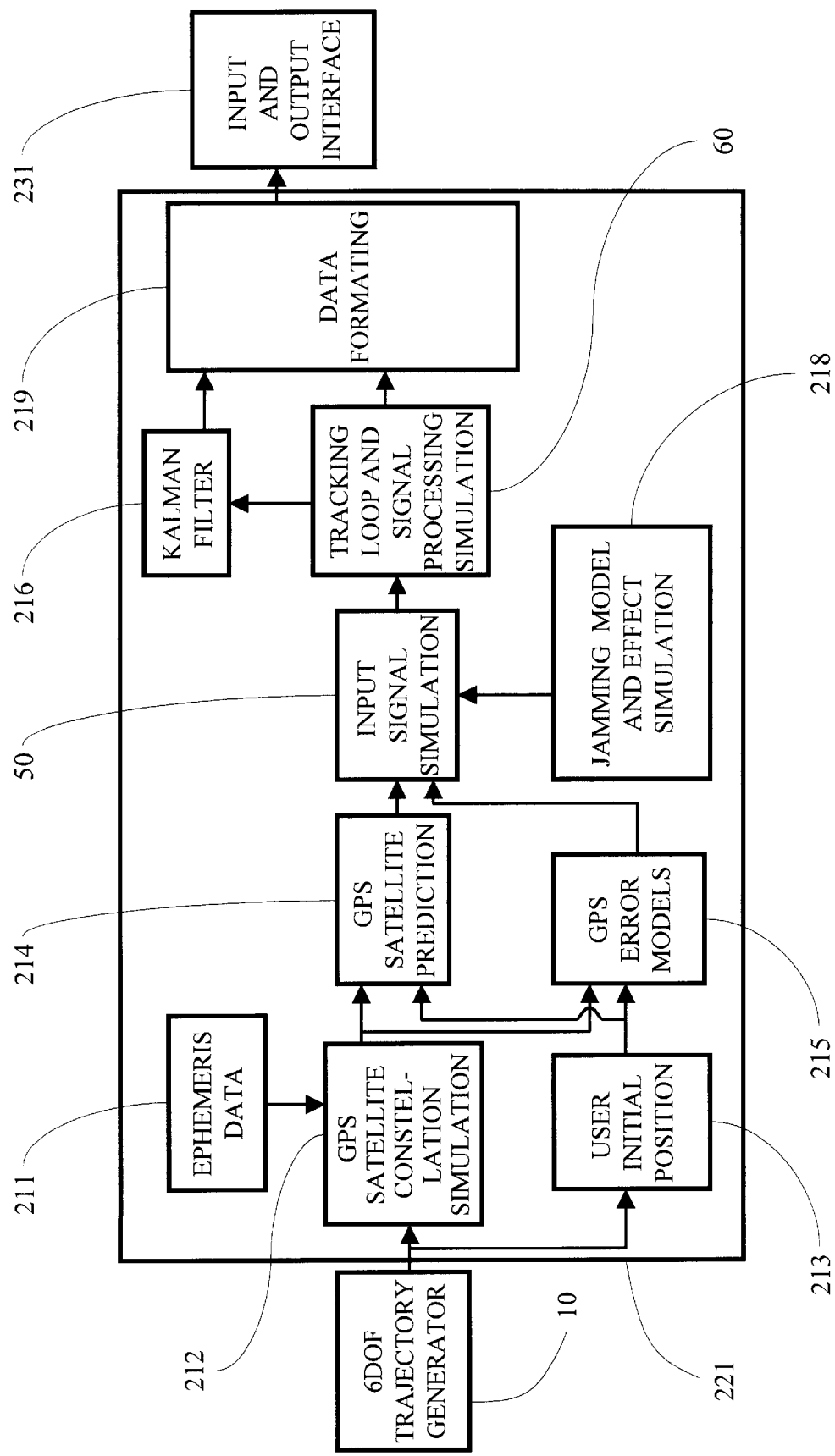
FIG. 4 is a block diagram illustrating the coupled real time emulation system with tracking loop model according to the above preferred embodiment of the present invention.

Referring to FIG. 4, the detailed GPS receiver model incorporates an input signal simulation 50 and a tracking loop and signal processing simulation 60 to replace the raw data generation 217 in the simplified model as shown in FIG. 3. The tracking loop and signal processing simulation 60 can accurately represent the characteristics and performance of the real GPS receiver 31.

Figure 5:
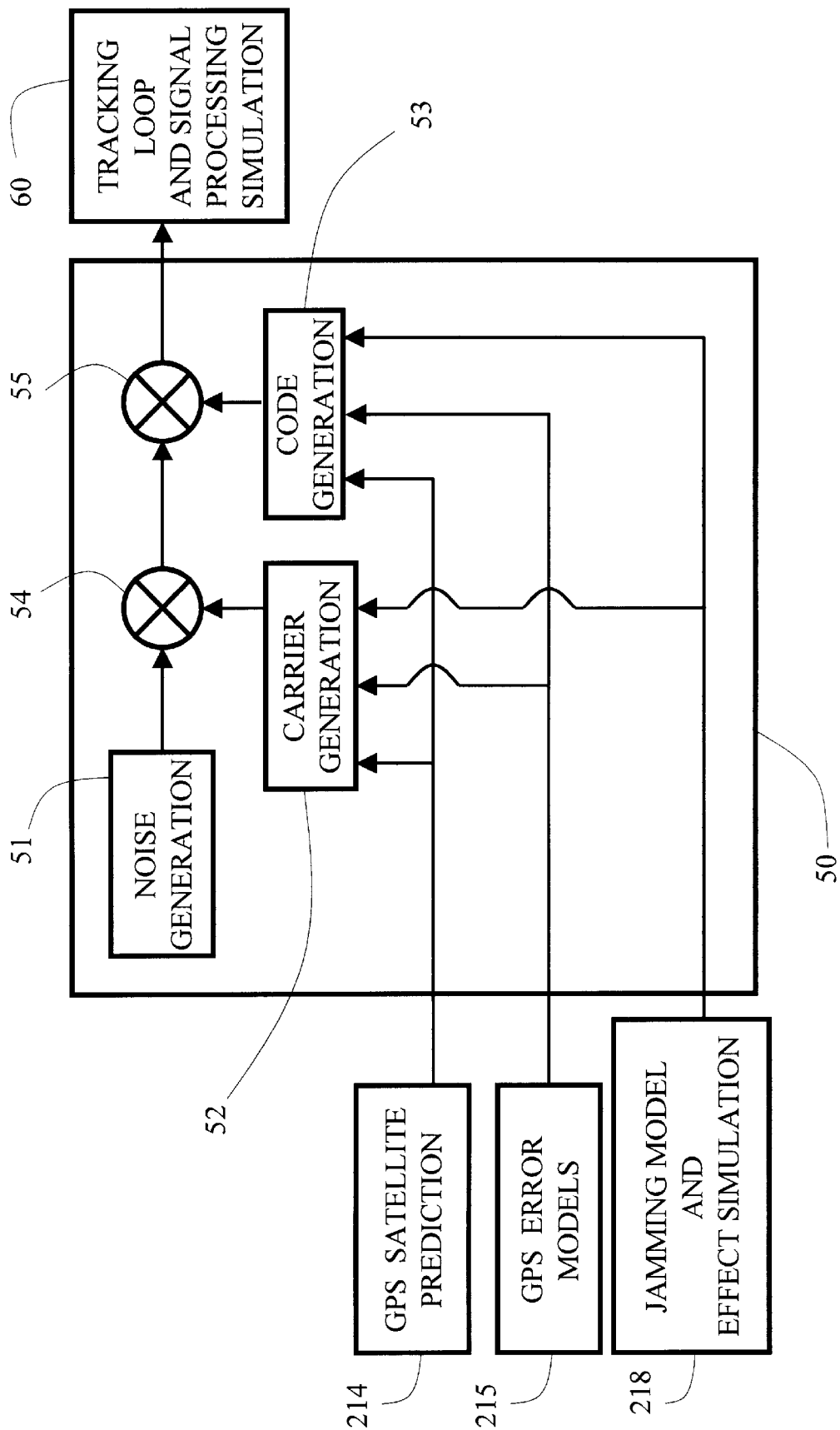
FIG. 5 is a block diagram illustrating the input signal simulation of he coupled real time emulation system as shown in FIG. 4 according to the above preferred embodiment of the present invention.

Referring to FIG. 5, the input signal simulation 50 generates a GPS spread spectrum signal at an intermediate frequency (IF), which comprises a noise generation 51 for generating a white noise using a random number method, a carrier generation 52 for creating a sine wave at a defined intermediate frequency, a code generation 53 adapted for generating a coarse acquisition (C/A) code or a precision (P) code, a first multiplier 54 for multiplying a white noise from the noise generation 51 and a sine signal from the carrier generation 52, and a second multiplier 55 for multiplying an output of the first multiplier 54 by the C/A code or P code generated by the code generation 53.

Figure 6:
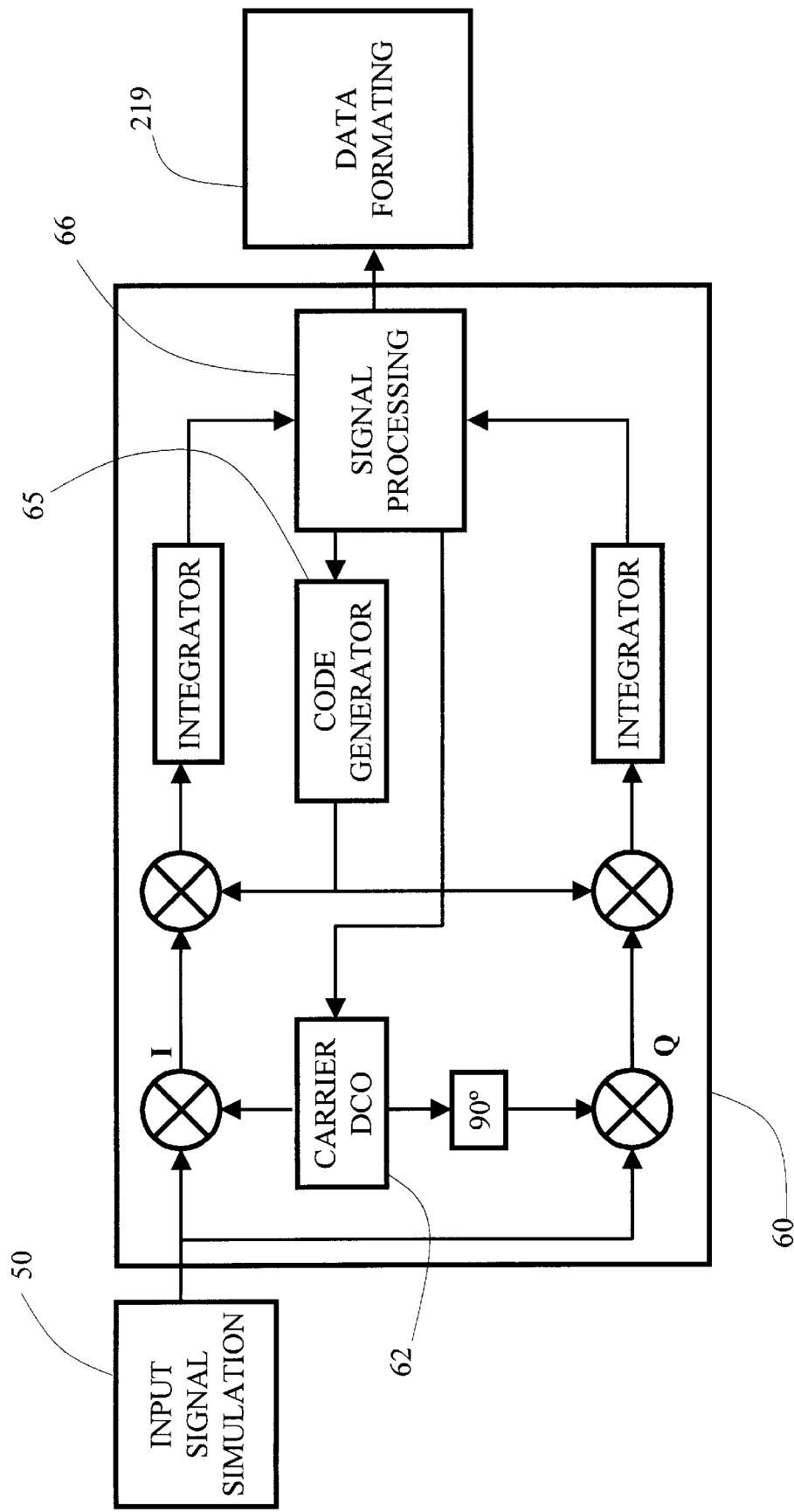
FIG. 6 is a block diagram illustrating the tracking loop and signal processing simulation of the coupled real time emulation system as shown in FIG. 4 according to the above preferred embodiment of the present invention.

FIG. 6 illustrates an implementation of one channel of the tracking loop and signal processing simulation 60. A modulated IF signal coming from the input signal simulation 50 is the input signal of the tracking loop and signal processing simulation 60. A signal processing 66 drives a carrier DCO 62 to generate a sine wave at the tracked frequency that is close to the intermediate frequency (IF). The deviation between the frequency of the generated sine wave and the input IF is called frequency tracking error. The signal processing 66 also drives a code generation 65 to produce the C/A code or P code same as the code generation 53.

Figure 7:
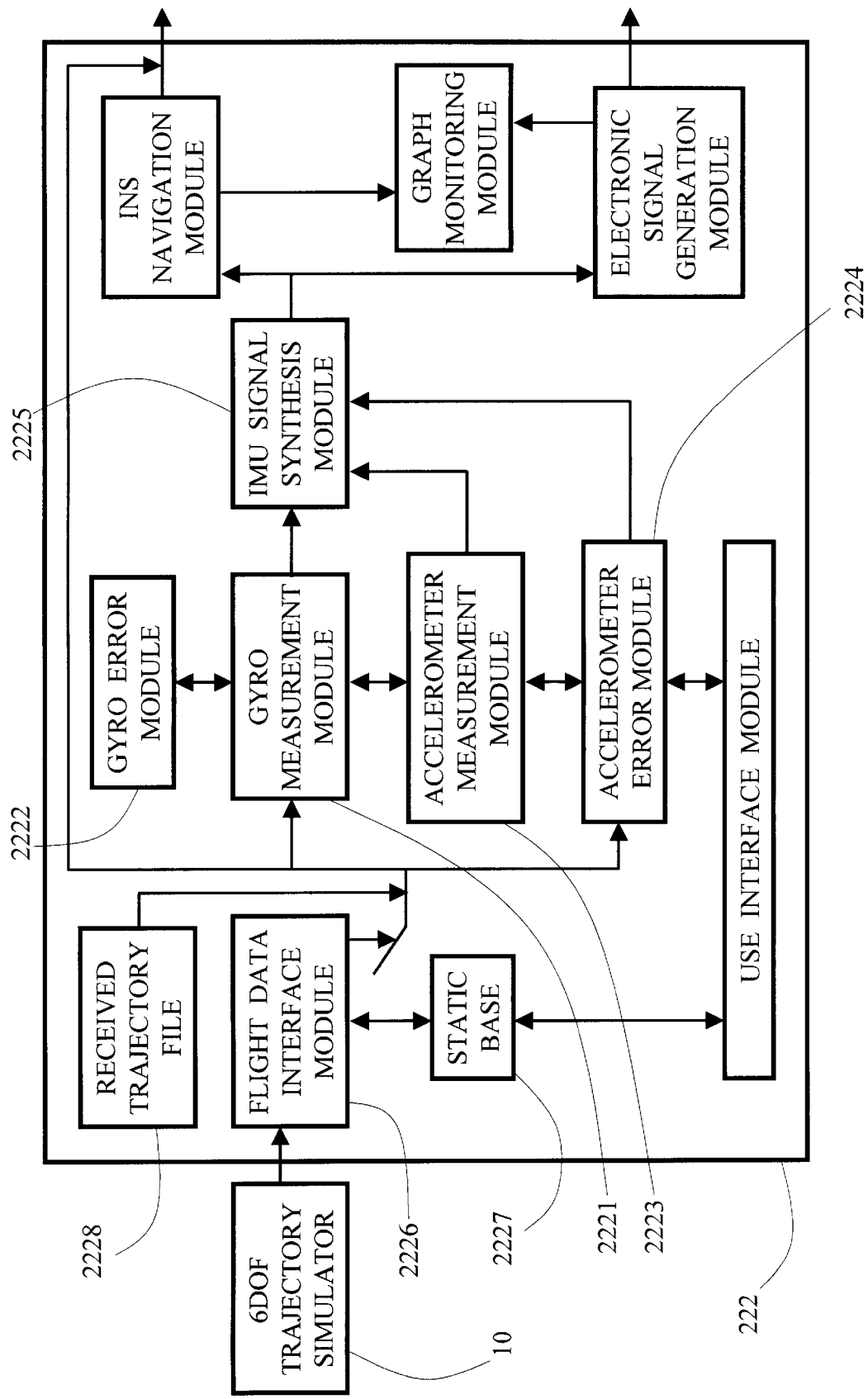
FIG. 7 is a block diagram illustrating an IMU emulation module according to the above preferred embodiment of the embodiment of the present invention.

Referring to FIG. 7, the IMU Emulation module 222 as shown in FIG. 2 comprises a gyro measurement model 2221, a gyro error model 2222, an accelerometer model 2223, an accelerometer error model 2224, and an IMU signal synthesis module 2225. The 6DOF trajectory data generated by the 6DOF trajectory generator 10 drives the gyro measurement model 2221 and the gyro error model 2222 to simulate a real gyro's characteristics and performance to form simulated gyro measurements and error which are combined by using an adder. The 6DOF trajectory data also drives the accelerometer measurement model 2223 and the accelerometer error model 2224 to simulate a real accelerometer's characteristics and performance to form simulated accelerometer measurements and error which are also combined by using an adder. The simulated gyro and accelerometer measurement data are processed by the IMU signal synthesis module 2225 to meet a specific protocol.

Figure 8:
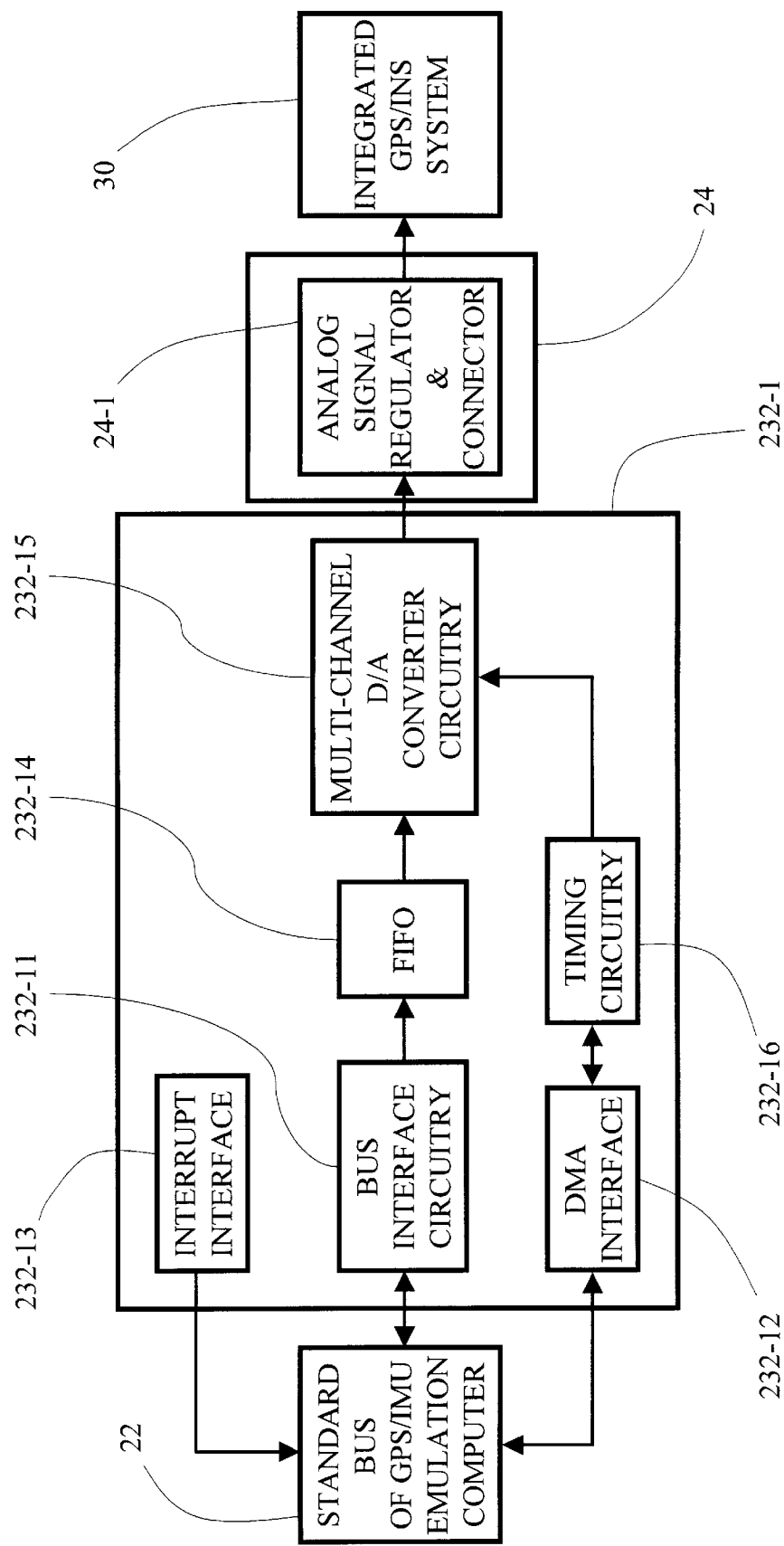
FIG. 8 is a block diagram illustrating an analog signal interface according to the above preferred embodiment of the present invention.
Figure 9:
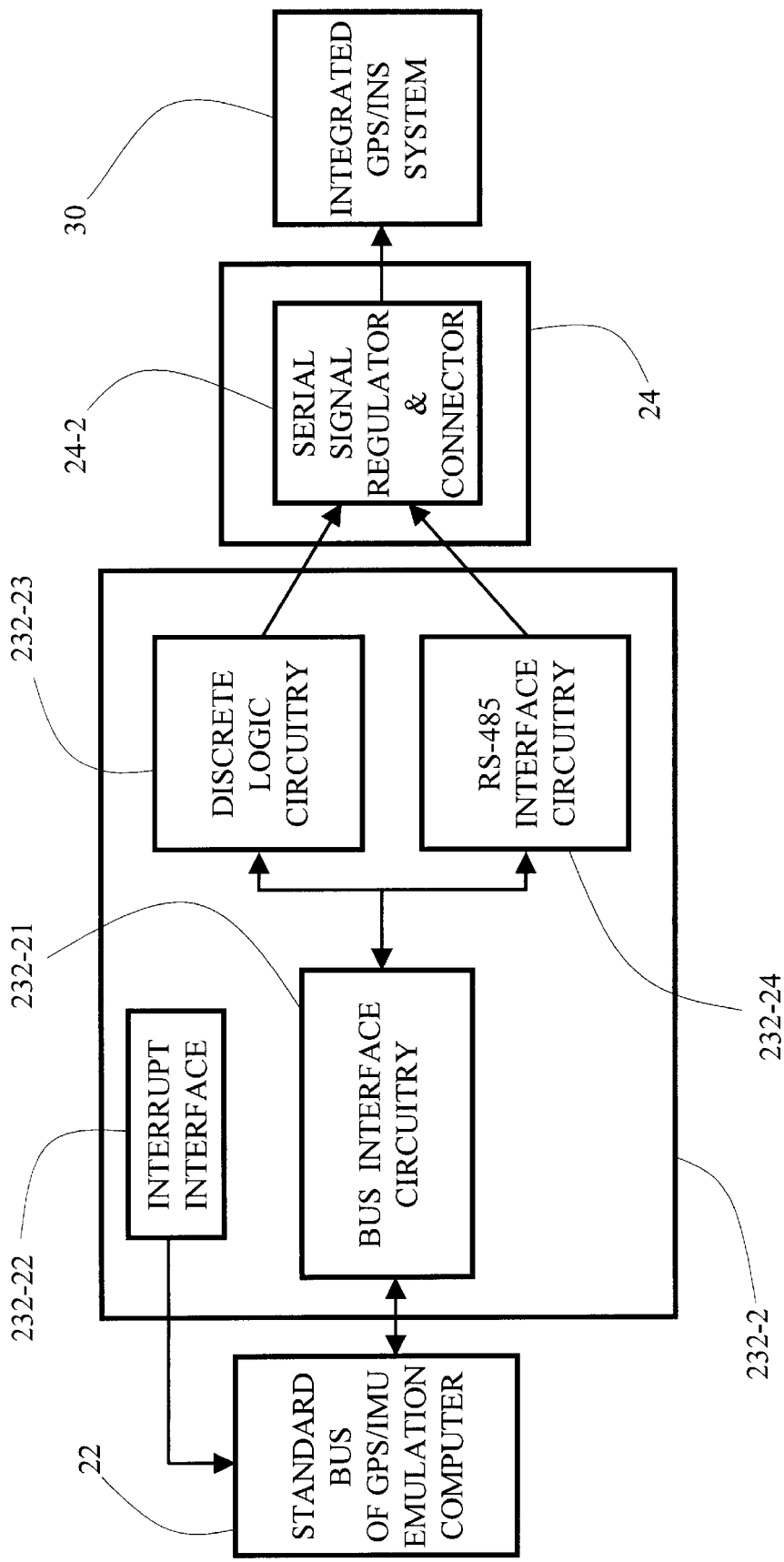
FIG. 9 is a block diagram illustrating a serial signal interface according to the above preferred embodiment of the present invention.
Figure 10:
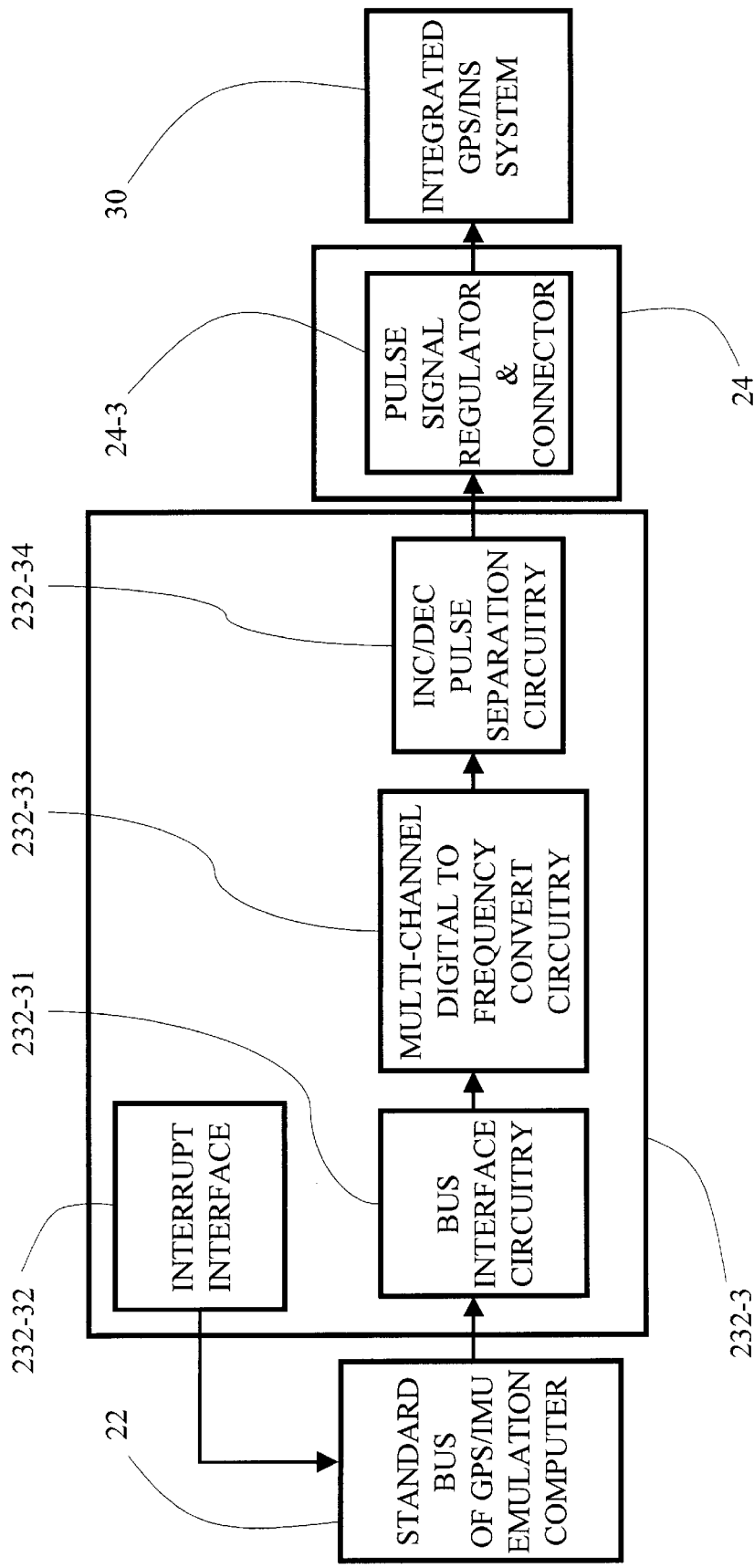
FIG. 10 is a block diagram illustrating a pulse signal interface according to the above preferred embodiment of the present invention.
Figure 11:
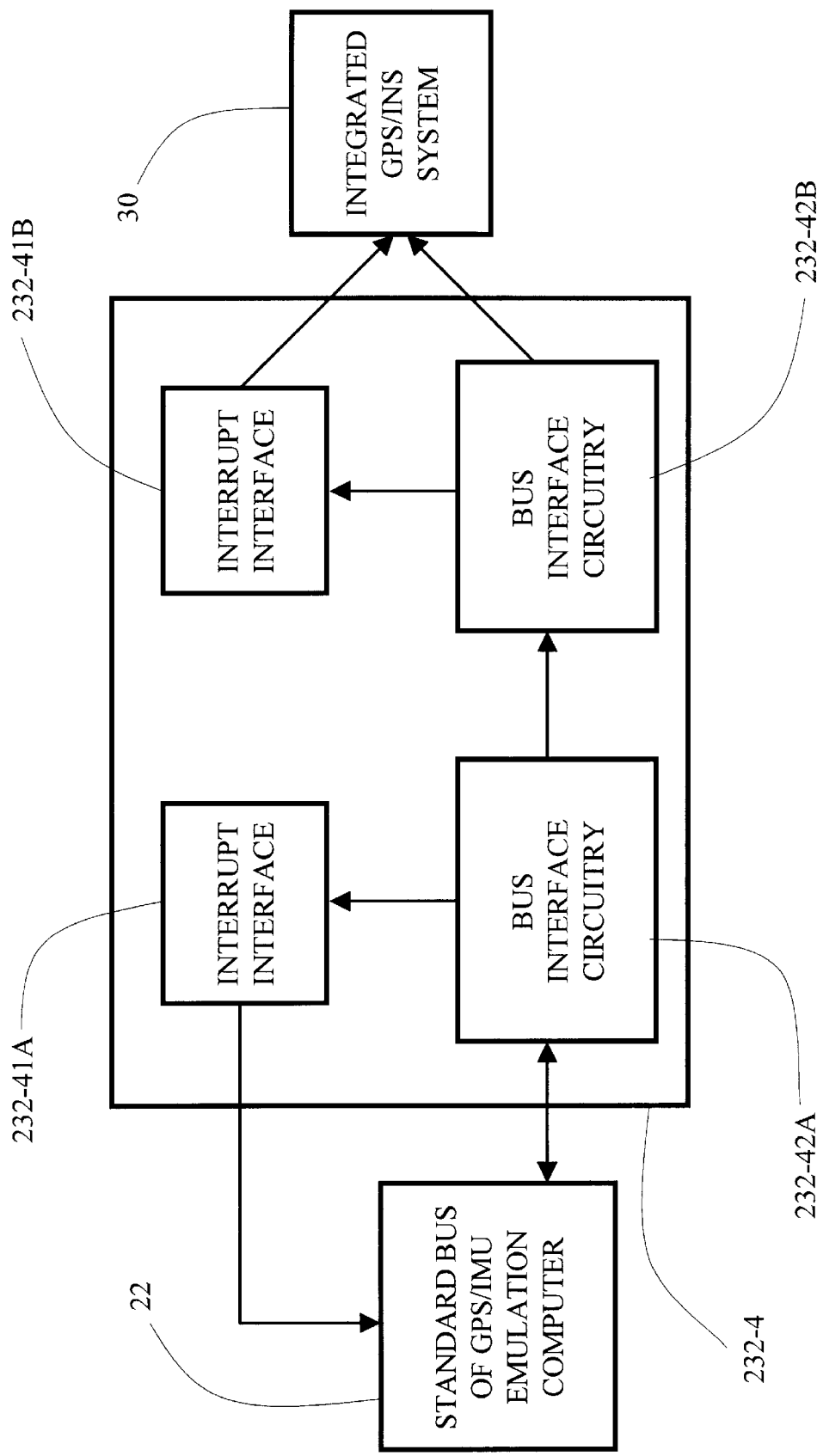
FIG. 11 is a block diagram illustrating a parallel digital signal interface according to the above preferred embodiment of the present invention.

The IMU input/output interface 232 as shown in FIG. 2 for IMU emulation includes an analog signal interface 232-1 (as shown in FIG. 8), a serial signal interface 232-2 (as shown in FIG. 9), a pulse signal interface 232-3 (as shown in FIG. 10), and a parallel digital signal interface 232-4 (as shown in FIG. 11). These interfaces 232-1, 232-2, 232-3, 232-4 are used to convert the simulated IMU measurement data into one kind of signal that can be injected into the Integrated GPS/INS System 30. The generated signals must be identical to those signals produced by the real IMU device 32 that is replaced by the GPS/IMU emulation system 20. There are many types of gyros and accelerometers which are fabricated by different manufacturers and have various signal types and connector requirements. Therefore, one of the core technologies in the GPS/IMU emulation system 20 is the electronic signal generation and its interface to the installed integrated GPS/INS system 30. The software implements the IMU measurement simulation, and the hardware converts the simulated IMU outputs into electronic signals which are injected into the installed integrated GPS/INS system 30. The injected signals must be compatible with the electronics of the on-board GPS/INS system and the injection method must present the least intrusion to the installed integrated GPS/INS system 30.

Generally, the outputs of the real IMU device 32 are analog signals, especially for low performance IMUs, which are often used with the GPS receiver 31 to form an integrated system. The analog interface 232-1 is a multi-channel D/A converter circuit board for generating analog IMU signals, which comprises a bus interface circuitry 232-11, a DMA interface 232-12, and an interrupt interface 232-13, as shown in FIG. 8. All these interfaces 232-11, 232-12, 232-13 are connected to the standard bus of the GPS/IMU emulation computer 22. The analog interface 232-1 further comprises a FIFO circuitry 232-14 connected to the bus interface circuitry 232-11, a multi-channel D/A converter circuitry 232-15 connected between the FIFO circuitry 232-14 and an analog signal regulator and/or isolator 24-1 of the signal regulator and connector board 24, and a timing circuitry 232-16 connected between the DMA interface 232-12 and the multi-channel D/A converter circuitry 232-15.

Since most IMU manufacturers trend to embed a high performance microprocessor into the IMU device to form a so-called "smart" IMU, in which the IMU output signals are sent out by the microprocessor through a standard serial bus, for example, RS-422/485, 1533 bus, etc., as shown in FIG. 9. The serial signal interface 232-2 is a multi-channel RS-422/485 communication control circuit board for generating serial IMU signals, which comprises a bus interface circuitry 232-21 connected with the standard bus of the GPS/IMU emulation computer 22, an interrupt interface 232-22 connected between the bus interface circuitry 232-21 and the standard bus of the GPS/IMU emulation computer 22, a discrete logic circuitry 232-23 connected between the bus interface circuitry 232-21 and a serial signal regulator and connector 24-2 of the signal regulator and connector board 24, and an RS-485 interface circuitry 232-24 connected between the bus interface circuitry 232-21 and the signal regulator and connector 24-2 of the signal regulator and connector board 24.

Due to the fact that most high performance gyros and accelerometers provide pulse outputs, RLG and FOG are inherently digital sensors, and many high performance electromechanical gyros and accelerometers have a pulse modulated force rebalance loop. Therefore, pulse output signals have many advantages over analog signals. As shown in FIG. 10, the pulse signal interface 232-3 is a multi-channel digitally controlled frequency generator circuit board for producing pulse IMU signals, which comprises a bus interface circuitry 232-31 connected with the standard bus of the GPS/IMU emulation computer 22, an interrupt interface 232-32 connected between the bus interface circuitry 232-31 and the standard bus of the IMU emulation computer 22, a multi-channel digital to frequency converter circuitry 232-33 connected with the bus interface circuitry 232-31, and a Inc/Dec pulse separation circuitry 232-34 connected between the multi-channel digital to frequency convert circuitry 232-33 and a pulse signal regulator and connector 24-3 of the signal regulator and connector board 24.

Some IMUs have embedded logic circuits or microprocessors which can output parallel digital signals or even implement a standard parallel bus. This type of IMU can send signals to the parallel interface of the integrated GPS/INS computer or to the backplane bus of the navigation system. As shown in FIG. 11, the parallel digital signal interface 232-4 comprises two sets of interrupt interfaces 232-41a, 232-41b and bus interface circuitries 232-42a, 232-42b, wherein the first set of the interrupt interface 232-41a and the bus interface circuitry 232-42a are mutually connected and respectively connected to the standard bus of GPS/IMU emulation computer 22 and the second set of the interrupt interface 232-41b and the bus interface circuitry 232-42b are also mutually connected and respectively connected to a standard bus of the GPS/INS navigation computer 33, and that the first bus interface circuitry 232-42a is connected to the second bus interface circuitry 232-42b.

According to the requirements of the IMU output signals, different types of signal generation circuits are designed to produce a specific type of signal required by a specific simulation task. These signal generation circuits are designed as a series of optional modules. Signal module design is based on the modularized IMU emulation computer 22 architecture design. According to the practical IMU product to be simulated, a specific type of signal generation board is chosen to produce the required electronic signals that will be injected into the GPS/INS navigation computer 33.

The Ethernet network controller board 21, as shown in FIG. 2, is used to receive real time vehicle flight trajectory data from the 6DOF trajectory generator 10. The 6DOF trajectory generator 10 and the real time IMU emulation system 20 can also been connected by a standard serial communication port such as RS-422/485, according to the application requirement.

As shown in FIGS. 8 to 10, the signal regulator and connector board 24 is used to convert the electronic signals produced by the signal generator into the required electrical specifications and form a suitable connector so that they can be directly injected into the installed integrated GPS/INS computer (such as the navigation computer) 33 of the GNC avionics on-board vehicle, i.e. the integrated GPS/INS system 30. The signal regulator and connector board 24 is designed for the specific user according to the specific IMU used in the system. This is because even if two IMUs have the same type of signal, they often have different signal ranges, scale factors, voltages, currents, and different connector arrangements. It usually consists of an amplifier, a buffer, a coupler and sometimes logic. Of course, it also forms a suitable connector for the specific installed system in order to replace the real IMU directly.

The coupled real time IMU and GPS simulation are inherently complex issues since the real IMU in the GPS/INS system is a self-contained device and the GPS receiver in the GPS/INS system cannot generate dynamic measurements when the vehicle does not move. For the IMU, it produces inertial measurements by itself without receiving any signal from the outside. Accordingly, when the vehicle is stationary, the outputs of the real IMU device 32 and the GPS receiver 31 are constant, so that in the dynamic test of the installed integrated GPS/INS system 30, the real IMU device 32 and the GPS receiver 31 in the vehicle have to be separated from the system and replaced by the coupled real time GPS/IMU emulation system 20 of the present invention. This replacement inherently causes an intrusion to the installed avionics system, i.e. the integrated GPS/INS system 30 according to the present embodiment.

Moreover, at present, there is no interface standard for IMU signals and connectors and there are many types of gyros and accelerometers which are fabricated by different manufacturers and have various signal types and connector requirements. Therefore, the core technology in the coupled real time GPS/IMU emulation system 20 is the electronic signal generation and its interface(s) to the installed integrated GPS/INS system 30. The software implements the IMU measurement modules and error modules according to the real time flight trajectory data, sensor models and parameters. The hardware converts the simulated IMU outputs into electronic signals which are injected into the installed integrated GPS/INS system 30. The injected signals must be compatible with the electronics of the on-board integrated GPS/INS system 30 and the injection method must present the least intrusion to the installed integrated GPS/INS system 30. The coupled real time GPS/IMU emulation system 20 is a practical equipment that resolves all these problems.

It is worth to mention that the software of the coupled real time GPS/IMU emulation system 20 can be modified to produce more efficient user interface and even includes a 6DOF trajectory generator in the coupled real time GPS/IMU emulation system 20.

Referring to FIG. 1, a test analysis system, the data acquisition and performance evaluation system 40 is further independently connected between the 6DOF trajectory generator 10 and the integrated GPS/INS system 30, wherein a reference trajectory is sent to the test analysis system 40 which is compared with on-board system solutions. The comparison of trajectory is used in two circumstances, one is for the coupled real time GPS/IMU emulation system 20 accuracy verification, the other is used in a practical test to evaluate the performances of the integrated GPS/INS system 30.

In view of the performance evaluation of the integrated GPS/INS system 30, the data produced by the 6DOF trajectory generator 10 is the ideal reference for the test mission. Using the simulated real time GPS and IMU signals, the integrated GPS/INS system 30 can resolve a vehicle trajectory. Comparing the ideal trajectory and the system resolved trajectory, we can evaluate the performance of the integrated system. Usually, the 6DOF trajectory data can produce the following flight data:

(1) Emulation time tag.
(2) Geodetic position, including altitude, longitude, and height above sea level.
(3) Position vector in ECIZ (an Earth Centered Inertial) frame.
(4) Velocity vector in ECIZ frame.
(5) Acceleration vector in ECIZ frame.
(6) Rotation matrix from ECIZ to the B (Body) frame.
(7) Angular velocity vector observed in ECIZ and resolved in the B frame.
(8) Angular acceleration vector observed in ECIZ and resolved in the B frame.

The integrated GPS/INS system 30 can produce the following outputs:

(1) Geodetic position, including altitude, longitude, and height above sea level.
(2) Velocity vector in N frame.
(3) Acceleration vector in N frame.
(4) Rotation matrix from N to the B (Body) frame.
(5) Angular velocity vector observed in N and resolved in the B frame.

It is noted that after some coordinate system transformations, most of the trajectory variables can be directly compared. Generally, we can obtain (1) the position accuracy, (2) the altitude accuracy, (3) the heading accuracy, (4) the attitude accuracy, and (5) the velocity accuracy for the system performance evaluation

What is claimed is:

1. A coupled real time GPS/IMU emulation method for positioning and location system, comprising the steps of:

(a) inputting IMU measurement models and IMU error models into a coupled real time GPS/IMU emulation system according to a real IMU device of an integrated GPS/INS system to be tested, wherein said IMU measurement models comprise gyro measurement model and accelerometer measurement model which are determined by inertial sensor principles, and that said IMU error models comprises gyro error model and accelerometer error model which are defined by a user according to said real IMU device used in said integrated GPS/INS system to be tested;

(b) producing real time trajectory data from a 6DOF trajectory generator and send said real time trajectory data to said coupled real time GPS/IMU emulation system, wherein said real time trajectory data are defined by said user and said coupled real time GPS/IMU emulation system produces dynamic GPS measurements and IMU signals as if a vehicle is really moving along a trajectory defined by said user;

(c) generating output data including real time IMU data by said IMU model of said coupled real time GPS/IMU emulation system, and said GPS measurements by a GPS receiver model in said GPS/IMU emulation system;

(d) formatting said GPS measurement data and converting said real time IMU data into IMU simulated electronic signals by an IMU signal generator in said coupled real time GPS/IMU emulation system, wherein said IMU signal generator is an interface board in an emulation computer provided in said coupled real time GPS/IMU emulation system;

(e) processing said simulated GPS measurements and generated IMU simulated electronic signals by a standard interface and a regulator and connector circuit to form suitable electrical specifications and a connector pin arrangement that is compatible to said integrated GPS/INS system; and (f) injecting said simulated GPS measurements and said IMU simulated electronic signals into said integrated GPS/INS system, wherein when said integrated GPS/INS system is excited in dynamic operation, a performance thereof is able to be tested and evaluated as if carrying a real transportation test.

2. A coupled real time GPS/IMU emulation method, as recited in claim 1, after the above step (f), further comprising an additional step of collecting test data from said integrated GPS/INS system by a data acquisition and performance evaluation system connected between said 6DOF trajectory generator and said integrated GPS/INS system, so as to compare said real time trajectory data from said 6DOF trajectory generator with integrated GPS/INS resolved vehicle trajectory data output from said integrated GPS/INS system in order to determine whether said integrated GPS/INS system works properly and to evaluate the performance thereof.

3. A coupled real time GPS/IMU emulation method, as recited in claim 1, wherein outputs of said coupled real time GPS/IMU emulation system is directly injected into said integrated GPS/INS system through bypassing an real GPS receiver and a real IMU device in said integrated GPS/INS system, said real time GPS/IMU emulation comprising:

an interface board including a GPS emulation input/output interface and an IMU emulation input/output interface;

an emulation computer comprising a GPS emulation module for performing GPS emulation and an IMU emulation module for performing IMU emulation, said GPS emulation module receiving said real time trajectory data from said 6DOF trajectory generator and generating dynamic GPS measurements including pseudoranges, carrier phases, and Doppler shifts, and positioning information including location information and velocity information, said dynamic GPS measurements being formatted to simulated GPS measurements and sent out through said GPS emulation input/output interface to said integrated GPS/INS system, wherein said velocity information from said integrated GPS/INS system is sent through said GPS emulation input/output interface to said GPS simulation module for GPS tracking loop aiding to facilitate said integrated GPS/INS system, said IMU emulation module receiving real time trajectory data from said 6DOF trajectory generator and producing IMU simulated measurements, said IMU emulation input/output interface projecting said IMU measurements into specific simulated electrical signals; and a signal regulator and connector board for converting electronic signals from said IMU emulation input/output interface into simulated electrical signals, wherein said simulated electrical signals, coupled with said simulated GPS measurements, are injected into said integrated GPS/INS system which causes an on-board GPS/INS navigation computer installed therein into working as if carrying real transportation test.

4. A coupled real time GPS/IMU emulation method, as recited in claim 3, further comprising an Ethernet network controller connected between said 6DOF trajectory generator and said GPS/IMU emulation computer for receiving said real time trajectory data from said 6DOF trajectory generator and sending said real time trajectory data to said GPS emulation module and said IMU emulation module respectively.

5. A coupled real time GPS/IMU emulation method, as recited in claim 4, wherein said GPS emulation module comprises:

a GPS satellite constellation simulation which is triggered by said 6DOF trajectory data from said 6DOF trajectory generator for reading orbit parameters, satellite clock parameters, and atmospheric parameters from ephemeris data, which are stored in said GPS/IMU emulation computer of said coupled real time GPS/IMU emulation system, and calculating a position and velocity vector in an Earth-Centered-Earth-Fixed (ECEF) coordinate system for all GPS satellites;

a user initial position which is given by said 6DOF trajectory data;

a GPS satellite prediction using information from said GPS satellite constellation simulation and said user initial position to determine visible GPS satellites and the elevation, azimuth, and Doppler shifts thereof;

a GPS Error Models for using said information from said GPS satellite constellation simulation and said user initial position to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

a raw data generation using said information from said GPS satellite prediction, said GPS error models, and said jamming model and effect simulation to calculate simulated pseudorange, carrier phase, and delta range for all visible satellites;

a Kalman filter for calculating said GPS receiver's position and velocity using said simulated raw data from said raw data generation; and a data formatting for formatting said position and velocity information and said simulated raw data along with said ephemeris data according to a specific protocol, wherein said data formatting an integral part which allows said simulated GPS measurements has a format identical to that of said real GPS receiver used in said integrated GPS/INS system.

6. A coupled real time GPS/IMU emulation method, as recited in claim 4, wherein said GPS emulation module comprises:

a GPS satellite constellation simulation which is triggered by said 6DOF trajectory data from said 6DOF trajectory generator for reading orbit parameters, satellite clock parameters, and atmospheric parameters from ephemeris data, which are stored in said GPS/IMU emulation computer of said coupled real time GPS/IMU emulation system, and calculating a position and velocity vector in an Earth-Centered-Earth-Fixed (ECEF) coordinate system for all GPS satellites;

a user initial position which is given by said 6DOF trajectory data;

a GPS satellite prediction using information from said GPS satellite constellation simulation and said user initial position to determine visible GPS satellites and the elevation, azimuth, and Doppler shifts thereof;

a GPS Error Models for using said information from said GPS satellite constellation simulation and said user initial position to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

an input signal simulation for generating a GPS spread spectrum signal at an intermediate frequency (IF), which comprises a noise generation for generating a white noise using a random number method, a carrier generation for creating a sine wave at a defined intermediate frequency, a code generation adapted for generating a coarse acquisition (C/A) code or a precision (P) code, a first multiplier for multiplying a white noise from said noise generation and a sine signal from said carrier generation and a second multiplier for multiplying an output of said first multiplier by said C/A code or P code generated by said code generation;

a tracking loop and signal processing simulation for accurately representing characteristics and performance of said real GPS receiver, wherein a modulated IF signal coming from said input signal simulation is an input signal of said tracking loop and signal processing simulation, said tracking loop and signal processing simulation comprising a carrier phase correction for driving a carrier DCO to generate a sine wave at said tracked frequency that is close to said intermediate frequency (IF), a deviation between said tracked frequency of said generated sine wave and said input IF being called frequency tracking error, and a code phase correction for driving a code generation to produce said C/A code or P code same as said code generation;

a Kalman filter for calculating said GPS receiver's position and velocity using said simulated raw data from said raw data generation; and a data formatting for formatting said position and velocity information and said simulated raw data along with said ephemeris data according to a specific protocol, wherein said data formatting an integral part which allows said simulated GPS measurements has a format identical to that of said real GPS receiver used in said integrated GPS/INS system.

7. A coupled real time GPS/IMU emulation method, as recited in claims 4, 5 or 6, wherein said IMU Emulation module comprises a gyro measurement model, a gyro error model, an accelerometer model, an accelerometer error model, and an IMU signal synthesis module, said 6DOF trajectory data generated by said 6DOF trajectory generator driving said gyro measurement model and said gyro error model to simulate a real gyro's characteristics and performance to form simulated gyro measurements and error which are combined by using an adder, said 6DOF trajectory data also driving said accelerometer measurement model and said accelerometer error model to simulate a real accelerometer's characteristics and performance to form simulated accelerometer measurements and error which are also combined by using an adder, said simulated gyro and accelerometer measurement data being processed by said IMU signal synthesis module to meet a specific protocol.

8. A coupled real time GPS/IMU emulation method, as recited in claim 7, wherein said IMU input/output interface for IMU emulation includes an analog interface which is a multi-channel D/A converter circuit board for generating analog IMU signals, which comprises a bus interface circuitry, a DMA interface, and an interrupt interface, which are connected to a standard bus of said GPS/IMU emulation computer, said analog interface further comprising a FIFO circuitry connected to said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

9. A coupled real time GPS/IMU emulation method, as recited in claim 7, wherein said IMU input/output interface for IMU emulation includes a serial signal interface which is a multi-channel RS-422/485 communication control circuit board for generating serial IMU signals, which comprises a bus interface circuitry connected with said standard bus of said GPS/IMU emulation computer, an interrupt interface connected between said bus interface circuitry and said standard bus of said GPS/IMU emulation computer, a discrete logic circuitry connected between said bus interface circuitry and a serial signal regulator and connector of said signal regulator and connector board, and an RS-485 interface circuitry connected between said bus interface circuitry and a signal regulator and connector of said signal regulator and connector board.

10. A coupled real time GPS/IMU emulation method, as recited in claim 7, wherein said IMU input/output interface for IMU emulation includes a pulse signal interface which is a multi-channel digitally controlled frequency generator circuit board for producing pulse IMU signals, which comprises a bus interface circuitry connected with said standard bus of said GPS/IMU emulation computer, an interrupt interface connected between said bus interface circuitry and said standard bus of said IMU emulation computer, a multi-channel digital to frequency converter circuitry connected with said bus interface circuitry, and a Inc/Dec pulse separation circuitry connected between said multi-channel digital to frequency convert circuitry and a pulse signal regulator and connector of said signal regulator and connector board.

11. A coupled real time GPS/IMU emulation method, as recited in claim 7, wherein said IMU input/output interface for IMU emulation includes a parallel digital signal interface which comprises two sets of interrupt interfaces and bus interface circuitries, wherein said first set of said interrupt interface and said bus interface circuitry are mutually connected and respectively connected to said standard bus of GPS/IMU emulation computer and said second set of said interrupt interface and said bus interface circuitry are also mutually connected and respectively connected to a standard bus of said GPS/INS navigation computer, and that said first bus interface circuitry is connected to said second bus interface circuitry.

12. A coupled real time GPS/IMU emulation method, as recited in claim 7, wherein said IMU input/output interface for IMU emulation includes an analog signal interface, a serial signal interface, a pulse signal interface, and a parallel digital signal interface, which are used to convert said simulated IMU measurement data into one kind of signal adapted to inject into said integrated GPS/INS system, said generated signals being identical to signals produced by said real IMU device that is replaced by said GPS/IMU emulation system.

13. A coupled real time GPS/IMU emulation method, as recited in claim 12, wherein said analog interface is a multi-channel D/A converter circuit board for generating analog IMU signals, which comprises a bus interface circuitry, a DMA interface, and an interrupt interface, which are connected to a standard bus of said GPS/IMU emulation computer, said analog interface further comprising a FIFO circuitry connected to said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

14. A coupled real time GPS/IMU emulation method, as recited in claim 13, wherein said serial signal interface is a multi-channel RS-422/485 communication control circuit board for generating serial IMU signals, which comprises a bus interface circuitry connected with said standard bus of said GPS/IMU emulation computer, an interrupt interface connected between said bus interface circuitry and said standard bus of said GPS/IMU emulation computer, a discrete logic circuitry connected between said bus interface circuitry and a serial signal regulator and connector of said signal regulator and connector board, and an RS-485 interface circuitry connected between said bus interface circuitry and a signal regulator and connector of said signal regulator and connector board.

15. A coupled real time GPS/IMU emulation method, as recited in claim 14, wherein said pulse signal interface is a multi-channel digitally controlled frequency generator circuit board for producing pulse IMU signals, which comprises a bus interface circuitry connected with said standard bus of said GPS/IMU emulation computer, an interrupt interface connected between said bus interface circuitry and said standard bus of said IMU emulation computer, a multi-channel digital to frequency converter circuitry connected with said bus interface circuitry, and a Inc/Dec pulse separation circuitry connected between said multi-channel digital to frequency convert circuitry and a pulse signal regulator and connector of said signal regulator and connector board.

16. A coupled real time GPS/IMU emulation method, as recited in claim 15, wherein said parallel digital signal interface comprises two sets of interrupt interfaces and bus interface circuitries, wherein said first set of said interrupt interface and said bus interface circuitry are mutually connected and respectively connected to said standard bus of GPS/IMU emulation computer and said second set of said interrupt interface and said bus interface circuitry are also mutually connected and respectively connected to a standard bus of said GPS/INS navigation computer, and that said first bus interface circuitry is connected to said second bus interface circuitry.

17. A coupled real time GPS/IMU emulation system, which is connected between an integrated GPS/IMU system for by passing a real GPS receiver and a real IMU device installed therein and a 6DOF trajectory generator for producing a real time trajectory data to send to said coupled real time GPS/IMU emulation system, comprising:

an interface board including a GPS emulation input/output interface and an IMU emulation input/output interface;

an emulation computer comprising a GPS emulation module for performing GPS emulation and an IMU emulation module for performing IMU emulation, said GPS emulation module receiving a real time trajectory data from said 6DOF trajectory generator and generating dynamic GPS measurements including pseudoranges, carrier phases, and Doppler shifts, and positioning information including location information and velocity information, said dynamic GPS measurements being formatted to simulated GPS measurements and sent out through said GPS emulation input/output interface to an integrated GPS/INS system, wherein said velocity information from said integrated GPS/INS system is sent through said GPS emulation input/output interface to said GPS simulation module for GPS tracking loop aiding to facilitate said integrated GPS/INS system, said IMU emulation module receiving real time trajectory data from said 6DOF trajectory generator and producing IMU simulated measurements, said IMU emulation input/output interface projecting said IMU measurements into specific simulated electrical signals; and a signal regulator and connector board for converting electronic signals from said IMU emulation input/output interface into simulated electrical signals, wherein said simulated electrical signals, coupled with said simulated GPS measurements, are injected into said integrated GPS/INS system which causes an on-board GPS/INS navigation computer installed therein into working as if carrying real transportation test.

18. A coupled real time GPS/IMU emulation system, as recited in claim 17, further comprising an Ethernet network controller connected between said 6DOF trajectory generator and said GPS/IMU emulation computer for receiving said real time trajectory data from said 6DOF trajectory generator and sending said real time trajectory data to said GPS emulation module and said IMU emulation module respectively.

19. A coupled real time GPS/IMU emulation system, as recited in claim 18, wherein said GPS emulation module comprises:

a GPS satellite constellation simulation which is triggered by said 6DOF trajectory data from said 6DOF trajectory generator for reading orbit parameters, satellite clock parameters, and atmospheric parameters from ephemeris data, which are stored in said GPS/IMU emulation computer of said coupled real time GPS/IMU emulation system, and calculating a position and velocity vector in an Earth-Centered-Earth-Fixed (ECEF) coordinate system for all GPS satellites;

a user initial position which is given by said 6DOF trajectory data;

a GPS satellite prediction using information from said GPS satellite constellation simulation and said user initial position to determine visible GPS satellites and the elevation, azimuth, and Doppler shifts thereof;

a GPS Error Models for using said information from said GPS satellite constellation simulation and said user initial position to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

a raw data generation using said information from said GPS satellite prediction, said GPS error models, and said jamming model and effect simulation to calculate simulated pseudorange, carrier phase, and delta range for all visible satellites;

a Kalman filter for calculating said GPS receiver's position and velocity using said simulated raw data from said raw data generation; and a data formatting for formatting said position and velocity information and said simulated raw data along with said ephemeris data according to a specific protocol, wherein said data formatting an integral part which allows said simulated GPS measurements has a format identical to that of said real GPS receiver used in said integrated GPS/INS system.

20. A coupled real time GPS/IMU emulation system, as recited in claim 18, wherein said GPS emulation module comprises:

a GPS satellite constellation simulation which is triggered by said 6DOF trajectory data from said 6DOF trajectory generator for reading orbit parameters, satellite clock parameters, and atmospheric parameters from ephemeris data, which are stored in said GPS/IMU emulation computer of said coupled real time GPS/IMU emulation system, and calculating a position and velocity vector in an Earth-Centered-Earth-Fixed (ECEF) coordinate system for all GPS satellites;

a user initial position which is given by said 6DOF trajectory data;

a GPS satellite prediction using information from said GPS satellite constellation simulation and said user initial position to determine visible GPS satellites and the elevation, azimuth, and Doppler shifts thereof;

a GPS Error Models for using said information from said GPS satellite constellation simulation and said user initial position to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

an input signal simulation for generating a GPS spread spectrum signal at an intermediate frequency (IF), which comprises a noise generation for generating a white noise using a random number method, a carrier generation for creating a sine wave at a defined intermediate frequency, a code generation adapted for generating a coarse acquisition (C/A) code or a precision (P) code, a first multiplier for multiplying a white noise from said noise generation and a sine signal from said carrier generation and a second multiplier for multiplying an output of said first multiplier by said C/A code or P code generated by said code generation;

a tracking loop and signal processing simulation for accurately representing characteristics and performance of said real GPS receiver, wherein a modulated IF signal coming from said input signal simulation is an input signal of said tracking loop and signal processing simulation, said tracking loop and signal processing simulation comprising a carrier phase correction for driving a carrier DCO to generate a sine wave at said tracked frequency that is close to said intermediate frequency (IF), a deviation between said tracked frequency of said generated sine wave and said input IF being called frequency tracking error, and a code phase correction for driving a code generation to produce said C/A code or P code same as said code generation;

a Kalman filter for calculating said GPS receiver's position and velocity using said simulated raw data from said raw data generation; and a data formatting for formatting said position and velocity information and said simulated raw data along with said ephemeris data according to a specific protocol, wherein said data formatting an integral part which allows said simulated GPS measurements has a format identical to that of said real GPS receiver used in said integrated GPS/INS system.

21. A coupled real time GPS/IMU emulation system, as recited in claim 18, 19 or 20, wherein said IMU Emulation module comprises a gyro measurement model, a gyro error model, an accelerometer model, an accelerometer error model, and an IMU signal synthesis module, said 6DOF trajectory data generated by said 6DOF trajectory generator driving said gyro measurement model and said gyro error model to simulate a real gyro's characteristics and performance to form simulated gyro measurements and error which are combined by using an adder, said 6DOF trajectory data also driving said accelerometer measurement model and said accelerometer error model to simulate a real accelerometer's characteristics and performance to form simulated accelerometer measurements and error which are also combined by using an adder, said simulated gyro and accelerometer measurement data being processed by said IMU signal synthesis module to meet a specific protocol.

22. A coupled real time GPS/IMU emulation system, as recited in claim 21, wherein said IMU input/output interface for IMU emulation includes an analog interface which is a multi-channel D/A converter circuit board for generating analog IMU signals, which comprises a bus interface circuitry, a DMA interface, and an interrupt interface, which are connected to a standard bus of said GPS/IMU emulation computer, said analog interface further comprising a FIFO circuitry connected to said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

23. A coupled real time GPS/IMU emulation system, as recited in claim 21, wherein said IMU input/output interface for IMU emulation includes a serial signal interface which is a multi-channel RS-422/485 communication control circuit board for generating serial IMU signals, which comprises a bus interface circuitry connected with said standard bus of said GPS/IMU emulation computer, an interrupt interface connected between said bus interface circuitry and said standard bus of said GPS/IMU emulation computer, a discrete logic circuitry connected between said bus interface circuitry and a serial signal regulator and connector of said signal regulator and connector board, and an RS-485 interface circuitry connected between said bus interface circuitry and a signal regulator and connector of said signal regulator and connector board.

24. A coupled real time GPS/IMU emulation system, as recited in claim 21, wherein said IMU input/output interface for IMU emulation includes a pulse signal interface which is a multi-channel digitally controlled frequency generator circuit board for producing pulse IMU signals, which comprises a bus interface circuitry connected with said standard bus of said GPS/IMU emulation computer, an interrupt interface connected between said bus interface circuitry and said standard bus of said IMU emulation computer, a multi-channel digital to frequency converter circuitry connected with said bus interface circuitry, and a Inc/Dec pulse separation circuitry connected between said multi-channel digital to frequency convert circuitry and a pulse signal regulator and connector of said signal regulator and connector board.

25. A coupled real time GPS/IMU emulation system, as recited in claim 21, wherein said IMU input/output interface for IMU emulation includes a parallel digital signal interface which comprises two sets of interrupt interfaces and bus interface circuitries, wherein said first set of said interrupt interface and said bus interface circuitry are mutually connected and respectively connected to said standard bus of GPS/IMU emulation computer and said second set of said interrupt interface and said bus interface circuitry are also mutually connected and respectively connected to a standard bus of said GPS/INS navigation computer, and that said first bus interface circuitry is connected to said second bus interface circuitry.

26. A coupled real time GPS/IMU emulation system, as recited in claim 21, wherein said IMU input/output interface for IMU emulation includes an analog signal interface, a serial signal interface, a pulse signal, and a parallel digital signal interface, which are used to convert said simulated IMU measurement data into one kind of signal adapted to inject into said integrated GPS/INS system, said generated signals being identical to signals produced by said real IMU device that is replaced by said GPS/IMU emulation system.

27. A coupled real time GPS/IMU emulation system, as recited in claim 26, wherein said analog interface is a multi-channel D/A converter circuit board for generating analog IMU signals, which comprises a bus interface circuitry, a DMA interface, and an interrupt interface, which are connected to a standard bus of said GPS/IMU emulation computer, said analog interface further comprising a FIFO circuitry connected to said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

28. A coupled real time GPS/IMU emulation system, as recited in claim 27, wherein said serial signal interface is a multi-channel RS-422/485 communication control circuit board for generating serial IMU signals, which comprises a bus interface circuitry connected with said standard bus of said GPS/IMU emulation computer, an interrupt interface connected between said bus interface circuitry and said standard bus of said GPS/IMU emulation computer, a discrete logic circuitry connected between said bus interface circuitry and a serial signal regulator and connector of said signal regulator and connector board, and an RS-485 interface circuitry connected between said bus interface circuitry and a signal regulator and connector of said signal regulator and connector board.

29. A coupled real time GPS/IMU emulation system, as recited in claim 28, wherein said pulse signal interface is a multi-channel digitally controlled frequency generator circuit board for producing pulse IMU signals, which comprises a bus interface circuitry connected with said standard bus of said GPS/IMU emulation computer, an interrupt interface connected between said bus interface circuitry and said standard bus of said IMU emulation computer, a multi-channel digital to frequency converter circuitry connected with said bus interface circuitry, and a Inc/Dec pulse separation circuitry connected between said multi-channel digital to frequency convert circuitry and a pulse signal regulator and connector of said signal regulator and connector board.

30. A coupled real time GPS/IMU emulation system, as recited in claim 29, wherein said parallel digital signal interface comprises two sets of interrupt interfaces and bus interface circuitries, wherein said first set of said interrupt interface and said bus interface circuitry are mutually connected and respectively connected to said standard bus of GPS/IMU emulation computer and said second set of said interrupt interface and said bus interface circuitry are also mutually connected and respectively connected to a standard bus of said GPS/INS navigation computer, and that said first bus interface circuitry is connected to said second bus interface circuitry.

31. A coupled real time GPS/IMU emulation system, as recited in claim 17, 18, 19, or 20, further comprising a data acquistion and performance evaluation system, which is independently connected between said 6DOF trajectory generator and said integrated GPS/IMU system, for comparing said real time trajectory data from said 6DOF trajectory generator with integrated GPS/INS resolved vehicle trajectory data output from said integrated GPS/INS system in order to determine whether said integrated GPS/INS system works properly and to evaluate the performance thereof.

32. A coupled real time GPS/IMU emulation system, as recited in claim 21, further comprising a data acquistion and performance evaluation system, which is independently connected between said 6DOF trajectory generator and said integrated GPS/IMU system, for comparing said real time trajectory data from said 6DOF trajectory generator with integrated GPS/INS resolved vehicle trajectory data output from said integrated GPS/INS system in order to determine whether said integrated GPS/INS system works properly and to evaluate the performance thereof.

33. A coupled real time GPS/IMU emulation system, as recited in claim 30, further comprising a data acquistion and performance evaluation system, which is independently connected between said 6DOF trajectory generator and said integrated GPS/IMU system, for comparing said real time trajectory data from said 6DOF trajectory generator with integrated GPS/INS resolved vehicle trajectory data output from said integrated GPS/INS system in order to determine whether said integrated GPS/INS system works properly and to evaluate the performance thereof.

* * * * *